United States Patent
Franke et al.

(10) Patent No.: US 9,224,524 B2
(45) Date of Patent: Dec. 29, 2015

(54) CABLE TERMINATION DEVICE

(75) Inventors: Jens Franke, Bad Pyrmont (DE); Thomas Fuehrer, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 287 days.

(21) Appl. No.: 13/824,486

(22) PCT Filed: Sep. 30, 2011

(86) PCT No.: PCT/EP2011/004925
§ 371 (c)(1),
(2), (4) Date: Mar. 18, 2013

(87) PCT Pub. No.: WO2012/045430
PCT Pub. Date: Apr. 12, 2012

(65) Prior Publication Data
US 2013/0192876 A1    Aug. 1, 2013

(30) Foreign Application Priority Data
Oct. 4, 2010 (DE) .......................... 10 2010 047 217

(51) Int. Cl.
*H01B 17/32* (2006.01)
*H02G 15/04* (2006.01)

(52) U.S. Cl.
CPC ............. *H01B 17/32* (2013.01); *H02G 15/043* (2013.01); *H02G 15/046* (2013.01)

(58) Field of Classification Search
CPC ........................................................ H01B 17/32
USPC .............................................................. 174/91
See application file for complete search history.

(56) References Cited

U.S. PATENT DOCUMENTS

| | | | | |
|---|---|---|---|---|
| 3,395,382 | A * | 7/1968 | Weagant | 439/523 |
| 3,614,295 | A * | 10/1971 | Gillemot et al. | 174/87 |
| 3,710,003 | A * | 1/1973 | Channell | 174/37 |
| 3,806,630 | A * | 4/1974 | Thompson et al. | 174/72 R |
| 4,496,065 | A * | 1/1985 | Nagy | 215/207 |
| 5,059,748 | A | 10/1991 | Allen et al. | |
| 5,162,617 | A * | 11/1992 | Ferbas | 174/138 F |
| 6,329,601 | B1 | 12/2001 | Bulford | |
| 6,367,357 | B1 * | 4/2002 | Thomas | 81/426 |
| 6,403,884 | B1 | 6/2002 | Lange | |
| 2006/0196676 | A1 * | 9/2006 | Stoesz et al. | 166/377 |

FOREIGN PATENT DOCUMENTS

| | | |
|---|---|---|
| DE | 29908267 U1 | 7/1999 |
| DE | 10244481 A1 | 3/2004 |
| DE | 202008015523 U1 | 4/2010 |
| EP | 1096605 A1 | 5/2001 |

OTHER PUBLICATIONS

International Search Report of Application No. PCT/EP2011/004925 (Jan. 7, 2013).

* cited by examiner

*Primary Examiner* — Timothy Thompson
*Assistant Examiner* — Michael F McAllister
(74) *Attorney, Agent, or Firm* — Leydig, Voit & Mayer, Ltd.

(57) ABSTRACT

A cable termination device includes a housing and an insertion opening for a cable in order to terminate the cable end so that it is safe to touch. The housing includes a sealing cap and a screw-on unit cooperating therewith. The insertion opening for receiving at least one cable end is provided on the screw-on unit, and the sealing cap has a rounded design toward the outer end.

20 Claims, 3 Drawing Sheets

CABLE TERMINATION DEVICE

CROSS REFERENCE TO RELATED APPLICATIONS

This application is a U.S. national phase application under 35 U.S.C. §371 of International Application No PCT/EP2011/004925, filed on Sep. 30, 2011 and claims benefit to German Patent Application No. DE 10 2010 047 217.4, filed on Oct. 4, 2010. The international application was published in German on Apr. 12, 2012, as WO 2012/045430 A1 under PCT Article 21(2).

The present invention relates to a cable termination device which is provided and suitable for terminating at least one end of a cable so that it is safe to touch.

A cable end which is sealed off from environmental factors such as dust and water is frequently required for example in the assembly of photovoltaic power generating systems. Cable termination devices of this type should routinely be of at least protection class IP67 to DIN EN 60529 or DIN 40050 part 9. This means that the cable termination device is made dust-tight and at least offers protection against the temporary immersion of the cable termination device in water, since such conditions may occur in the case of cables laid in the open, for example when they are used in photovoltaic power generating systems. Apart from when it is used in photovoltaic power generating systems, it is however also possible to use the cable termination device according to the invention on other electrical or electronic components.

To simplify the assembly of photovoltaic power generating systems, the power cables can be produced e.g. with T-pieces at regular intervals directly on the roll, in order later to facilitate the prefabrication and the attachment of the solar modules. Then for example such a cable has T-pieces for connecting solar modules at predetermined intervals of e.g. 1 m or the like. For assembling solar modules, it is then only necessary to unroll the desired length of solar cable from the roll and to cut it off to the desired length.

Upon the subsequent assembly, the solar modules can then be attached laterally to the T-pieces which are already present. It is, however, important for the cut-off free end of the solar cable to be reliably terminated. Owing to the high current intensities and voltages which are possible in photovoltaic power generating systems, it is important to terminate the power cable so that it is safe to touch, and permanently reliably.

Since with the increasing mounting of photovoltaic power generating systems on the roofs of private households also increasingly inexperienced persons have access to such electrical systems, it is important to terminate such solar cables such that the inhabitants or owners of a house equipped with a photovoltaic power generating system are exposed to the lowest possible risk.

It is therefore the object of the present invention to make available a cable termination device which is simple to assemble and provides reliable protection against contact.

This object is achieved by a cable termination device with the features of Claim 1. Preferred developments of the invention are the subject of the dependent claims. Further advantages and features of the invention will become apparent from the example of embodiment.

The cable termination device according to the invention has a housing with at least one introduction opening for a cable, in order to terminate the cable end so that it is safe to touch. The housing comprises a sealing cap and a screwing unit which cooperates therewith. In this case, the at least one introduction opening for receiving at least one cable end is provided on the screwing unit, and the sealing cap is formed rounded-off towards the outer end.

The cable termination device according to the invention has many advantages, since it offers simple assembly and a high degree of safety. Due to the fact that the sealing cap is formed rounded-off towards the outer end, it is not possible to disassemble it by hand without a further tool. It is not readily possible to unscrew the screwing unit by hand, since the hand cannot find sufficient purchase on the rounded-off sealing cap. Thus the cable termination device according to the invention in a simple manner offers a high degree of safety, in particular when used on solar cables for photovoltaic power generating systems. Inexpert persons who lay their hands on such a cable termination device cannot open the cable termination device without a special tool.

A further advantage is that the shaping of the sealing cap permits reliable and permanent protection against accidental or unintentional opening of the cable termination device, even if the housing parts which typically consist of plastics material, such as the sealing cap and screwing unit, should be subject to settlement processes.

Protective devices for cable ends have become known in the prior art, but splitting boxes in which individual inputs are sealed off by sealing plugs can be opened even without a tool, so that private individuals who are unfamiliar with the risk of opening cable termination devices of photovoltaic power generating systems may expose themselves to considerable risk.

A further disadvantage is the cost of such components and the considerably increased assembly effort. Here the invention offers the advantage of low assembly effort and the further advantage of low costs.

In a preferred development, a securing means is provided on the outer end of the sealing cap, which means can be grasped in particular with a tool. A securing means on the outer end of the sealing cap offers the advantage that the sealing cap can be held with a tool which acts on the securing means while the screwing unit is being screwed. Once screw-connection has taken place, the tool can be removed, so that subsequent reopening is not possible without a tool.

Preferably the securing means comprises at least one slot and/or a through-hole which extends transversely to the longitudinal extent of a cable which is to be terminated. For example, a tool such as a screwdriver can be inserted through a through-hole and thus used for fixing in position. The screwing unit can be turned relative to the locally fixed sealing cap in order to close the housing of the cable termination device and to terminate the cable held therein so that it is safe to touch.

Preferably the sealing cap is formed for instance crowned on the outer end. Such a crowned configuration offers advantages, since it is possible to fix the crowned end of the sealing cap by hand only with very great difficulty. It is thus practically impossible to open the cable termination device accidentally.

Preferably the sealing cap has an external thread over at least one longitudinal section. In particular, the screwing unit has an internal thread over at least one longitudinal region. Particularly preferably, the internal thread of the screwing unit cooperates with the external thread of the sealing cap in order to screw-connect the housing of the cable termination device.

Preferably at least one splicing ring is received at least partially within the sealing cap.

Advantageously, the sealing cap has a clamping means with at least one clamping contour and/or the splicing ring has at least one clamping groove. Particularly preferably, the clamping contour of the sealing cap cooperates with the clamping groove in the splicing ring.

In this case, it is particularly preferable for at least one core of the cable or the cable as a whole to be able to be held in clamped manner between the clamping contour and the clamping groove. This achieves particularly advantageous fastening of the cable end to the cable termination device, since upon screwing the screwing unit to the sealing cap the splicing ring arranged therebetween, together with the sealing cap, reliably clamps the held cable end.

Particularly preferably, a plurality of clamping contours and a plurality of clamping grooves are arranged distributed over the periphery in defined manner. This makes it possible, for example, for a multi-core cable to be clamped securely and reliably, with each individual core of the cable being clamped at a pair consisting of clamping contour and clamping groove. Particularly preferably, the clamping contours are arranged in a star-shape, so that the individual cores of a multi-core cable extend in a star-shape from the centre outwards. This means that particularly large creepage distances between the individual core ends are made possible, which additionally contributes to safety.

The clamping grooves are in particular V-shaped, and serve to receive the core ends, which are clamped there by corresponding clamping contours in the form of profiles or the like. The clamping contours and clamping grooves may be provided distributed symmetrically over the periphery. It is possible for the individual clamping grooves and clamping contours to be provided equidistant from each other. It is even also possible for individual clamping contours to be arranged in groups, the distance of individual groups from one another being greater than the distance between individual cores in a group.

Preferably at least one sealing means is provided between the splicing ring and the sealing cap. The sealing means may for example comprise at least one O-ring, or be formed as such.

Preferably a sealing unit is arranged radially within the splicing ring. In particular, the sealing unit is provided between the cable and the internal contour of the splicing ring.

The screwing unit may have at least one sealing cone which upon screwing the screwing unit to the sealing cap compresses a lamellar structure of the splicing ring, so that the sealing unit within the splicing ring is pressed against an inserted cable end and thus protects the cable end from the ingress of water and dust and the like.

A high degree of reliability and safety is attained by the splicing ring, which clamps the cable in its entirety or its individual cores separately. Even with great force, a cable cannot readily be pulled out of the cable termination device. Furthermore, the cable termination device according to the invention is inexpensive and simple to assemble.

For assembly, the sheath of the cable can be removed over a portion and the screwing part and the splicing ring are pushed onto the cable end. The individual cores are fixed in the clamping grooves, and the projecting ends can simply be cut off. Following this, the sealing cap is pushed on and fixed in terms of angle via a screwdriver or the like, while the screwing part is screwed to the sealing cap. This clamps the individual cores between the clamping grooves and the clamping contours, so that very secure seating of the cable end on the cable termination device occurs.

Once assembly has taken place, the screwdriver can be removed and disassembly is not possible without a tool.

Due to the cores being separated in a star-shape, the open core ends are spread apart as far as possible from each other, so that reliable protection and maximum possible air and creepage distances are made available.

Further advantages and features of the present invention will become apparent from the description of the example of embodiment, which will be explained below with reference to the appended figures.

Figure 1:
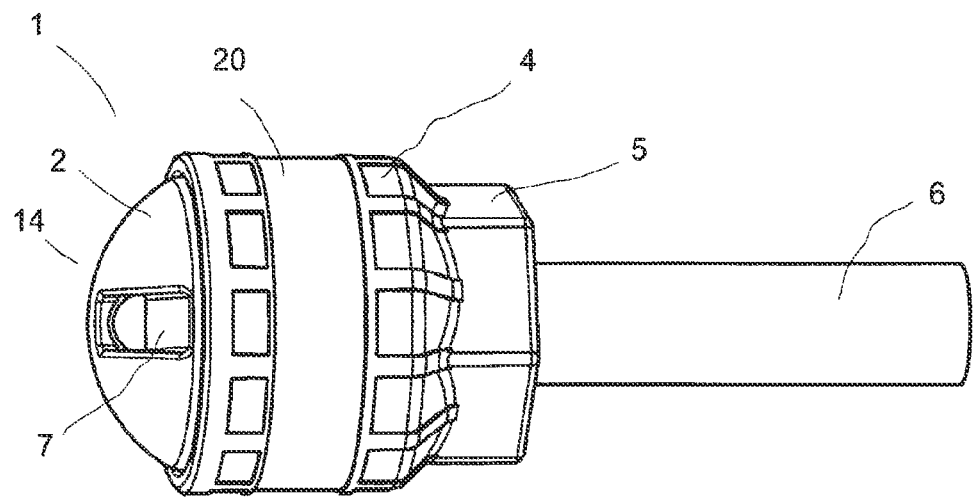
FIG. 1 shows a perspective view of a cable termination device according to the invention.

An example of embodiment of the invention is explained with reference to the appended FIGS. 1 to 8, FIG. 1 depicting a slightly perspective view of a cable termination device 1 according to the invention.

The cable termination device 1 comprises a sealing cap 2 which is crowned at the outer end 14 in order to offer little resistance to the hand and thus to prevent unintentional opening of the cable termination device 1.

The cable termination device 1 furthermore comprises a screwing part or a screwing unit 4 which has spanner flats 5 which can be grasped with a spanner, pliers or another tool in order to screw the screwing unit 4 to the sealing cap 2.

The screwing unit 4 together with the sealing cap 2 forms the housing 20, which receives a cable end 13 of a cable 6 held therein so that it is safe to touch, and reliably protects it from contact, flashover or the like.

Figure 2:
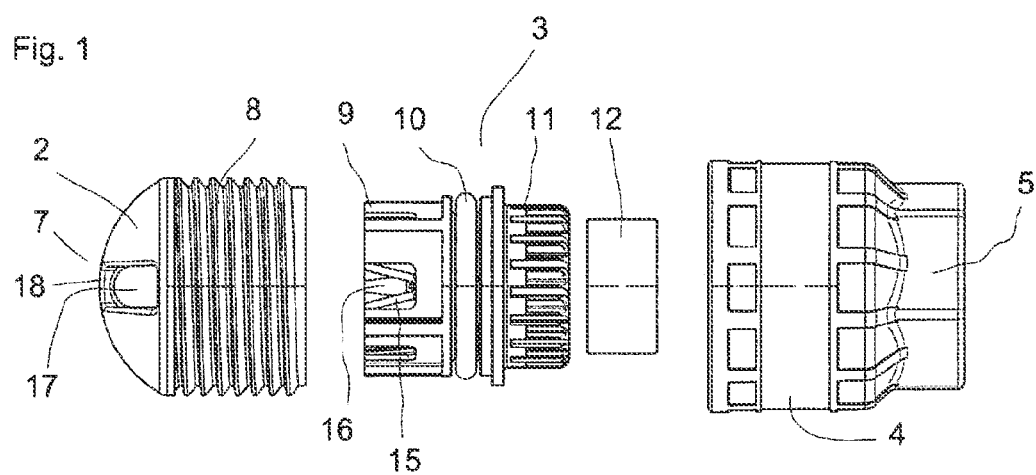
FIG. 2 shows an exploded view of a cable termination device according to FIG. 1.
Figure 3:
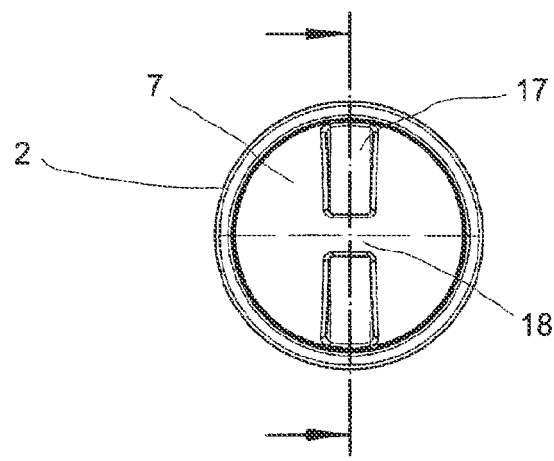
FIG. 3 shows a top view of the sealing cap of the cable termination device of FIG. 1.

On the sealing cap 2 there is provided a securing means 7 which, as can clearly be seen in FIGS. 2 and 3, here has slots 17 and a crosspiece 18. The slots 17 form a through-hole which is covered by the crosspiece 18.

As illustrated in FIG. 2, the sealing cap 2 has an external thread 8 which is intended to be connected by screwing to an internal thread 24 of the screwing unit 4. In so doing, the splicing ring 3 is held between the screwing unit 4 and the sealing cap 2. Clamping grooves 16 with inclines 15 are provided on the splicing ring 3 in order to hold the single cores 19, not shown in FIG. 2, of the cable 6 in clamping manner in the clamping grooves 16. Between the individual clamping grooves 16 there are provided codings 9 which permit insertion of the splicing ring 3 into the sealing cap 2 only in predefined positions. An O-ring 10 as sealing means serves to seal off with respect to the sealing cap 2.

On the end of the splicing ring 3 which faces the screwing unit 4, there is provided a lamellar structure 11 which cooperates with the sealing unit 12 during screw-connection in order to hold the cable end 13 of the cable 6 in sealing manner on the screwing unit 4.

Figure 4:
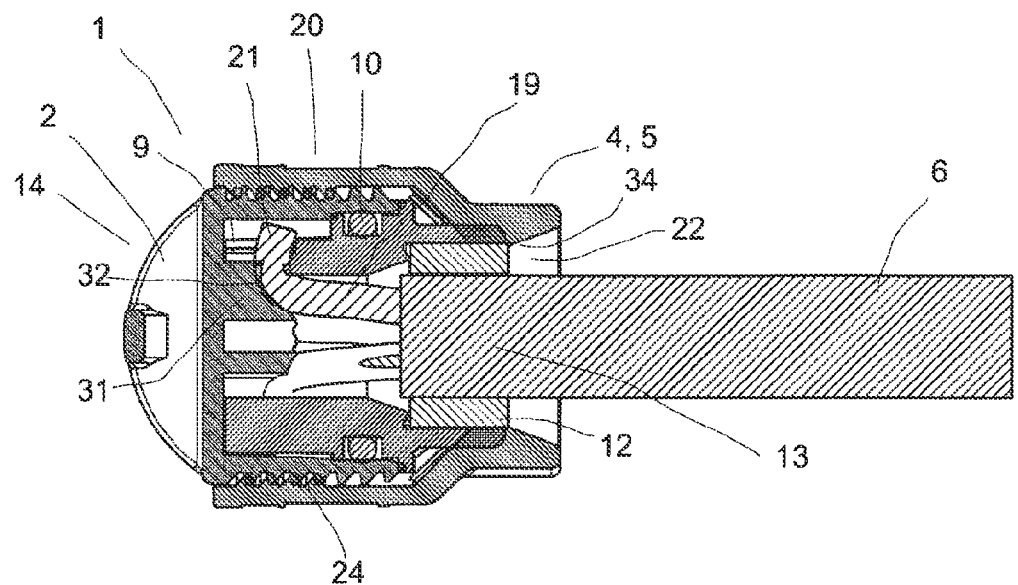
FIG. 4 shows a cross-section through the cable termination device according to FIG. 1.

FIG. 4 illustrates a cross-section through the cable termination device 1 according to FIG. 1. The core ends 21 of the single cores 19 of the cable 6 are clamped by the clamping means 31. Each clamping means 31 comprises a clamping contour 32 in the sealing cap 2 and a clamping groove 16 in the splicing ring 3, so that each single core 19 is clamped reliably between the splicing ring 3 and the sealing cap 2 with its core end 21. The O-ring 10 serves to seal off from the outside.

The sealing unit 12, which is pressed against the cable end 13 by the compressed lamellar structure 11, serves for sealing off the cable end 13 relative to the screwing unit 4.

Upon screw-connecting the screwing unit 4, the external thread 8 of the sealing cap 2 is screwed into the internal thread 24 of the screwing unit 4. Before screw-connection, the cable end 13 is inserted into the introduction opening 22.

Figure 5:
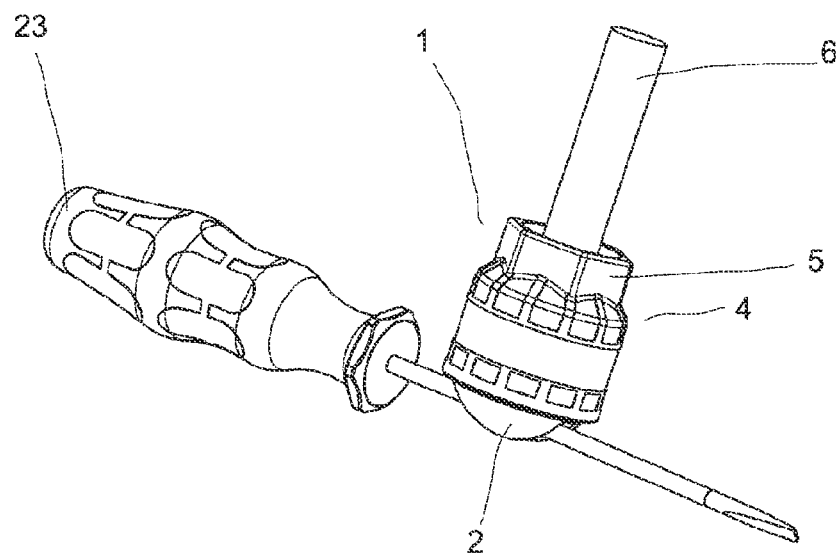
FIG. 5 shows the cable termination device according to FIG. 1 during assembly.

FIG. 5 shows the cable termination device 1 during assembly, with a tool 23 being inserted through the securing means 7 so that the screwing unit 4 can be screwed to the sealing cap 2.

Figure 6:
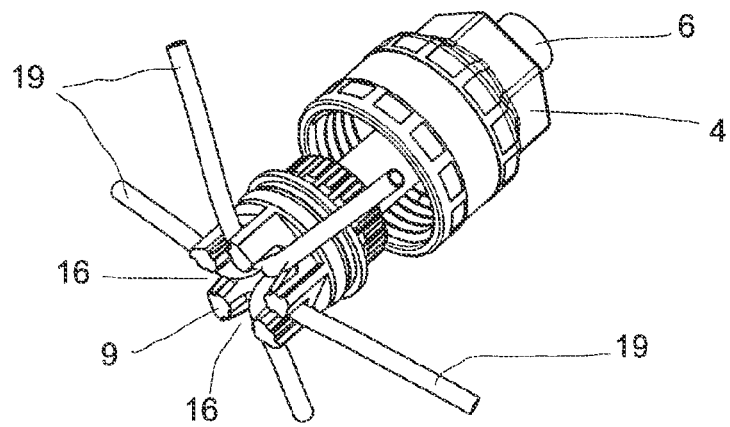
FIG. 6 shows the screwing part and the splicing ring of the cable termination device according to FIG. 1 once individual cores have been placed inside.
Figure 7:
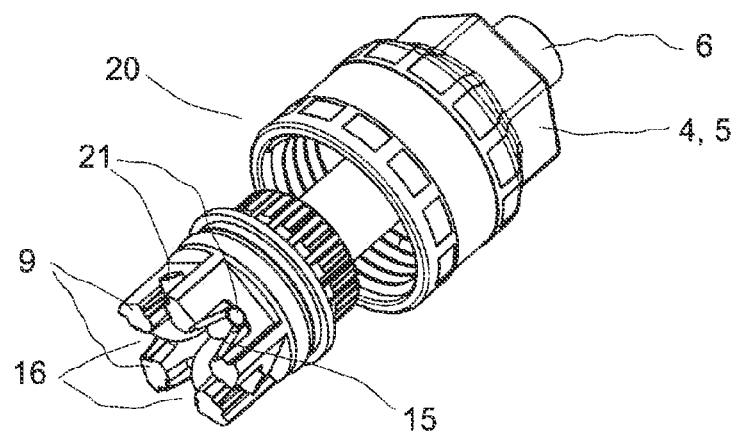
FIG. 7 shows the splicing ring and the screwing part according to FIG. 6 once projecting core ends have been cut off.
Figure 8:
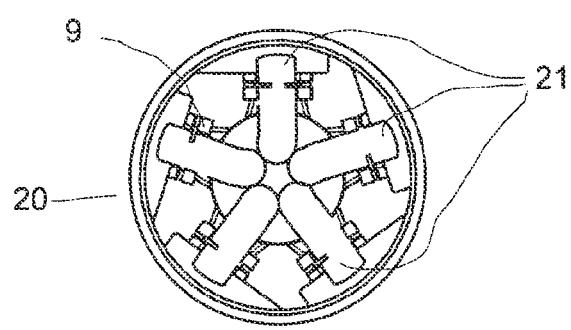
FIG. 8 shows a top view of a screwing part with a splicing ring contained therein.

FIGS. 6, 7 and 8 illustrate further steps of the assembly. The assembly will be explained below with reference to these figures. Upon assembly, the cable end 13 of the cable 6 is pushed through the introduction opening 22 of a screwing unit 4. Then the cable end 13 is passed through the splicing ring 3. The single cores are exposed and bent over into the clamping grooves 16 of the splicing ring. The projecting ends of the individual cores 19 are cut off, so that the ends 21 of the single cores 19 are arranged in the region of the clamping grooves 16.

Then the screwing unit 4 is screwed to the sealing cap 2, the splicing ring being held non-rotationally in the sealing cap 2.

The securing means 7 on the sealing cap 2 can in principle be of any configuration whatsoever. For example, it is also possible for two spaced-apart holes to be provided in the sealing cap, into which holes a tool is introduced, so that it is possible to fix the sealing cap against rotation.

The cable termination device according to the invention permits great imperviousness to the penetration of water and dust, since a high degree of imperviousness can be achieved by sealing off the splicing ring from the outside by for example an O-ring. Furthermore, likewise a high degree of imperviousness is achieved between the cable end 13 and the splicing ring by the for example rubber-elastic sealing unit.

The invention offers many advantages, since a high degree of tensile strength can also be achieved.

The clamping of the single cores between the splicing ring and the sealing cap permits a high degree of tensile strength. At the same time, fastening of the individual cores by means of screws, springs or similar is dispensed with. It is possible to use simple plastics-material parts which are sealed off by means of standardised seals.

A tool is necessary for re-opening, even should a certain settling process have occurred in the plastics-material parts used.

A star-shaped arrangement of the single cores makes particularly large air and creepage distances available.

LIST OF REFERENCE NUMERALS cable termination device 1
sealing cap 2
splicing ring 3
screwing unit 4
spanner flat 5
cable 6
securing means 7
external thread 8
coding 9
sealing means, O-ring 10
lamellar structure 11
sealing unit 12
cable end 13
outer end 14
incline 15
clamping groove 16
slot 17
crosspiece 18
single core 19
housing 20
core end 21
introduction opening 22
tool 23
internal thread 24
clamping means 31
clamping contour 32
sealing cone 34

The invention claimed is:

1. A cable termination device, comprising:
   a housing; and
   an introduction opening for a cable,
   wherein the cable termination device is configured to terminate a cable end so that the cable end is safe to touch,
   wherein the housing comprises a sealing cap and a screwing unit which cooperates with the sealing cap,
   wherein the introduction opening is configured to receive at least one cable end and is provided on the screwing unit, and
   wherein the sealing cap is formed rounded-off towards an outer end,
   wherein the screwing unit includes a sealing cone,
   wherein, upon screwing the screwing unit to the sealing cap, a lamellar structure of the splicing ring is compressed, so that the sealing unit is pressed against an inserted cable end,
   wherein at least one splicing ring is received at least partially within the sealing cap, and
   wherein at least one sealing O-ring is provided between the splicing ring and the sealing cap.

2. The cable termination device of claim 1, wherein a securing element is provided on the outer end of the sealing cap.

3. The cable termination device of claim 1, wherein the securing element includes a slot transversely to the longitudinal extent of a cable which is to be terminated.

4. The cable termination device of claim 1, wherein the sealing cap is crowned on the outer end.

5. The cable termination device of claim 1, wherein the sealing cap includes an external thread over at least one longitudinal section.

6. The cable termination device of claim 1, wherein the screwing unit includes an internal thread over at least one longitudinal region.

7. The cable termination device of claim 1, wherein the sealing cap includes a clamping device including a clamping contour.

8. The cable termination device of claim 1, wherein at least one core of the cable or the cable as a whole can be held in clamped manner between a clamping contour and a clamping groove.

9. The cable termination device of claim 1, wherein a plurality of clamping contours and clamping grooves are arranged distributed over the periphery in defined manner.

10. The cable termination device of claim 1, wherein a sealing unit is arranged radially within the splicing ring.

11. The cable termination device of claim 2, wherein a tool is necessary for fixing the securing element.

12. The cable termination device of claim 1, wherein the securing element includes a through-hole transversely to the longitudinal extent of a cable which is to be terminated.

13. The cable termination device of claim 3, wherein the securing element includes a through-hole transversely to the longitudinal extent of a cable which is to be terminated.

14. The cable termination device of claim 1, wherein the splicing ring includes a clamping groove.

15. The cable termination device of claim 7, wherein the splicing ring includes a clamping groove.

16. A cable termination device, comprising:
a housing; and
an introduction opening for a cable,
wherein the cable termination device is configured to terminate a cable end so that the cable end is safe to touch,
wherein the housing comprises a sealing cap and a screwing unit which cooperates with the sealing cap,
wherein the introduction opening, configured to receive at least one cable end, is provided on the screwing unit, and
wherein the sealing cap is formed rounded-off towards an outer end,
wherein the screwing unit includes a sealing cone,
wherein, upon screwing the screwing unit to the sealing cap, a lamellar structure of the splicing ring is compressed, so that the sealing unit is pressed against an inserted cable end, and
wherein at least one sealing element is provided between the splicing ring and the sealing cap.

17. A cable termination device, comprising:
a housing; and
an introduction opening for a cable,
wherein the cable termination device is configured to terminate a cable end so that the cable end is safe to touch,
wherein the housing comprises a sealing cap and a screwing unit which cooperates with the sealing cap,
wherein the introduction opening, configured to receive at least one cable end, is provided on the screwing unit,
wherein the sealing cap is formed rounded-off towards an outer end,
wherein the screwing unit includes a sealing cone, and
wherein upon screwing the screwing unit to the sealing cap a lamellar structure of the splicing ring is compressed, so that the sealing unit is pressed against an inserted cable end.

18. The cable termination device of claim 16, wherein a securing element is provided on the outer end of the sealing cap.

19. The cable termination device of claim 17, wherein a securing element is provided on the outer end of the sealing cap.

20. The cable termination device of claim 16, wherein the securing element includes a slot transversely to the longitudinal extent of a cable which is to be terminated.

* * * * *